(12) United States Patent
Holst et al.

(10) Patent No.: US 12,188,848 B2
(45) Date of Patent: Jan. 7, 2025

(54) FLUID MANAGEMENT SYSTEM AND METHOD

(71) Applicant: ILLUMINA, INC., San Diego, CA (US)

(72) Inventors: Gregory L. Holst, San Diego, CA (US); Jay Taylor, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 156 days.

(21) Appl. No.: 17/835,807

(22) Filed: Jun. 8, 2022

(65) Prior Publication Data
US 2022/0299396 A1    Sep. 22, 2022

Related U.S. Application Data

(63) Continuation of application No. 16/734,065, filed on Jan. 3, 2020, now Pat. No. 11,397,124.

(60) Provisional application No. 62/789,283, filed on Jan. 7, 2019.

(51) Int. Cl.
  *G01M 3/04*    (2006.01)

(52) U.S. Cl.
  CPC .................... *G01M 3/047* (2013.01)

(58) Field of Classification Search
  CPC ..................................... G01M 3/047
  See application file for complete search history.

(56) References Cited

U.S. PATENT DOCUMENTS

| | | | |
|---|---|---|---|
| 4,857,453 A | 8/1989 | Ullman et al. | |
| 4,864,847 A * | 9/1989 | Anderson | G01M 3/04 73/40 |
| 5,458,852 A | 10/1995 | Buechler | |
| 5,786,220 A | 7/1998 | Pronovost et al. | |
| 5,824,268 A | 10/1998 | Bernstein et al. | |
| 6,175,310 B1 * | 1/2001 | Gott | G01M 3/165 73/40 |
| 6,235,241 B1 | 5/2001 | Catt et al. | |
| 6,484,564 B1 * | 11/2002 | Hayashida | G01M 3/38 73/40 |

(Continued)

FOREIGN PATENT DOCUMENTS

| | | |
|---|---|---|
| CN | 102132137 A | 7/2011 |
| CN | 202119605 U | 1/2012 |

(Continued)

OTHER PUBLICATIONS

CAP-300 Capacitive Level Sensor, <https://www.gemssensors.com/search-products/line/Level-Sensors-Switches/> emily/Single-Point-Level-Switches?=SeriesDisplayTitleICAP-300+Capacitive+Level+Sensor, retrieved on Nov. 1, 2018, 3 pages, last accessed on May 12, 2020.

(Continued)

*Primary Examiner* — John Fitzgerald
(74) *Attorney, Agent, or Firm* — MARSHALL, GERSTEIN & BORUN LLP

(57) ABSTRACT

A fluid detection system includes a wicking material to draw fluid away from a first location with space limitations and proximate to a fluid device or a fluid interface. The wicking material draws the fluid to a remote fluid indicator at a second location. Contact between fluid and the remote fluid indicator produces a detectable alteration to the remote fluid indicator, and a non-contact optical sensor detects the alteration.

26 Claims, 6 Drawing Sheets

(56) References Cited

U.S. PATENT DOCUMENTS

| | | | |
|---|---|---|---|
| 6,551,842 | B1 | 4/2003 | Carpenter |
| 6,602,719 | B1 | 8/2003 | Carpenter |
| 6,752,785 | B2 | 6/2004 | Van Antwerp et al. |
| 6,967,105 | B2 | 11/2005 | Nomura et al. |
| 7,454,955 | B2 * | 11/2008 | DeVries ................. B41J 2/1714 73/40 |
| 8,845,274 | B1 | 9/2014 | Garvin et al. |
| 9,360,478 | B2 | 6/2016 | Abbott et al. |
| 9,709,458 | B1 | 7/2017 | Garvin et al. |
| 10,473,572 | B2 | 11/2019 | Abbott et al. |
| 10,928,288 | B2 | 2/2021 | Abbott et al. |
| 11,346,741 | B2 * | 5/2022 | Curtis ..................... G01M 3/22 |
| 11,397,124 | B2 * | 7/2022 | Holst ...................... G01M 3/38 |
| D1,003,452 | S * | 10/2023 | Taylor .......................... D24/224 |
| D1,012,313 | S * | 1/2024 | Taylor .......................... D24/232 |
| 11,992,326 | B2 * | 5/2024 | Ghaffari ............... A61B 5/4266 |
| 12,064,761 | B2 * | 8/2024 | Delattre .................. B01L 3/527 |
| 2002/0192833 | A1 | 12/2002 | Pan et al. |
| 2006/0008896 | A1 | 1/2006 | Nazareth et al. |
| 2010/0064773 | A1 | 3/2010 | Meredith et al. |
| 2011/0232380 | A1 | 9/2011 | Deverse et al. |
| 2014/0208831 | A1 | 7/2014 | Ghodrati |
| 2014/0248717 | A1 | 9/2014 | Nazareth et al. |
| 2016/0158517 | A1 | 6/2016 | Nebbia et al. |
| 2017/0003192 | A1 | 1/2017 | Ling et al. |
| 2017/0350561 | A1 * | 12/2017 | Wagg ........................ F17D 5/06 |
| 2019/0053758 | A1 * | 2/2019 | Biederman ............ G06F 1/1635 |
| 2019/0216359 | A1 | 7/2019 | Chuang et al. |
| 2019/0351413 | A1 * | 11/2019 | Delattre ............ B01L 3/502715 |
| 2020/0064298 | A1 | 2/2020 | Laurenson |
| 2020/0214637 | A1 * | 7/2020 | Brownhill ........... A61F 13/0206 |
| 2020/0378959 | A1 * | 12/2020 | Hall .................... G01N 21/8483 |
| 2020/0408750 | A1 | 12/2020 | Khattak |
| 2021/0148906 | A1 * | 5/2021 | Fiechtner ......... G01N 33/54389 |
| 2023/0404546 | A1 * | 12/2023 | May ..................... A61B 5/4261 |

FOREIGN PATENT DOCUMENTS

| | | |
|---|---|---|
| CN | 101223434 B | 3/2013 |
| CN | 205002923 U | 1/2016 |
| DE | 197 14 601 A1 | 11/1997 |
| JP | H04-319639 A | 11/1992 |
| JP | 2000-180294 A | 6/2000 |
| JP | 2018-194596 A | 12/2018 |
| KR | 20050101716 A | 10/2005 |
| SU | 1474213 A1 | 4/1989 |
| WO | WO-2016/064881 A1 | 4/2016 |
| WO | WO-2017/004002 A1 | 1/2017 |

OTHER PUBLICATIONS

LS-3 Series Level Switch, <https://ecatalog.gemssensors.com/ecatalog/singlepoint-level/en/116826,> 1 page, retrieved pri Nov. 1, 2018, last accessed on May 12, 2020.

Rain Sensor Module Sensitivity Weather Module for Arduino Interface—Multi, <https://www.gearbest.com/other-accessories/pp_1802002.html?> Atid=14333638<currency=USD&vip=158778768<gclid=CjOKCQjwgOzdBRDIARIsAJ6_HNmryV1VVT9Q0sUnZxUIEat8M 3XpKq-X_vTInfPFYUFJyUeJzS1gObqwaAiNmEALw_wcB, 1 page, retrieved on Nov. 1, 2018, last accessed on \lay 12, 2020.

Tape Indicator, <https://www.digikey.com/products/en?keywords=3M10531-ND,> retrieved on Nov. 1, 2018, 3 pages, last accessed on May 12, 2020.

Hopper, H., "A Dozen Ways to Measure Fluid Level and How They Work," https://www.sensorsmag.com/ mmponents/a-dozen-ways-to-measure-fluid-level-and-how-they-work, Dec. 1, 2004, 13 pages, last accessed on May 11, 2020.

Written Opinion and Search Report for Singapore Patent Application No. 11202012645S, dated Dec. 18, 2022.

* cited by examiner

FLUID MANAGEMENT SYSTEM AND METHOD

CROSS-REFERENCE TO RELATED APPLICATIONS

The present application is a continuation of U.S. patent application Ser. No. 16/734,065 filed on Jan. 3, 2020, which claims priority to U.S. Provisional Patent Application No. 62/789,283 filed on Jan. 7, 2019, the content of each of which is incorporated by reference herein in their entireties and for all purposes.

BACKGROUND

Poor instrument reliability due to fluid leaks results in decreases in efficiency and increases in costs, for example, the cost to service the instrument and replace damaged parts. However, conventional fluid sensor systems cannot be used in close proximity to leak sources with space constraints, and positioning fluid sensors away from such leak sources leads to slower detection speeds, larger volumes of fluid being leaked prior to detection, and thus greater damage to fluid-sensitive parts. Moreover, space constraints present difficulties in resetting or replacing a sensor system, especially sensor systems that rely on physical contact with a fluid.

For example, float sensors may use large volumes of fluid to activate buoyancy. Electrical impedance sensors and optical meniscus sensors may be positioned to have contact between the sensor and fluid and thus require cleaning to be reset, particularly for saline fluids that can leave behind residue after evaporating. Capacitive sensors can use complex drive circuitry and be positioned to have close proximity to the fluid. Also, space constraints may impede the use in small spaces of sensors that utilize visual inspection of the sensor, such as tape indicators.

Therefore, a need exists for a fluid detection system and method that can efficiently detect small volumes of fluid leaked in proximity to fluid-sensitive parts in a small space, and for such a system to be contained in a consumable component. A need also exists for such a system and method that would also mitigate damage to fluid-sensitive parts.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure encompass a system for detecting fluid. The system comprises a wicking material to draw fluid from a first location to a second location remote from the first location, wherein the wicking material extends from the first location to the second location and wherein the first location is disposed proximate to a fluid retention boundary so as to be exposed to fluid escaping the fluid retention boundary. For example, the first location can be disposed proximate to a fluid device that might fail or a fluid interface connecting two or more fluid flow devices or between two fluid devices. The system further comprises a remote fluid indicator located at the second location, wherein the remote fluid indicator contacts a portion of the wicking material at the second location, wherein a detectable alteration to the remote fluid indicator is produced when fluid contacts the remote fluid indicator. The system further comprises an optical sensor to detect the detectable alteration, wherein the optical sensor does not physically contact the remote fluid indicator.

Aspects of the disclosure encompass a method of detecting fluid. The method comprises contacting a fluid with a wicking material at a first location at which the fluid has escaped a fluid retention boundary, wherein the wicking material extends from the first location to a second location remote from the first location. For example, the first location can be disposed proximate to a fluid device that might fail or a fluid interface connecting two or more fluid flow devices or between two fluid devices. The method further comprises drawing the fluid from the first location to the second location via the wicking material. The method further comprises contacting the fluid with a remote fluid indicator in contact with the wicking material at the second location, wherein the contact between the fluid and the remote fluid indicator produces a detectable alteration to the remote fluid indicator. The method further comprises detecting the detectable alteration via an optical sensor operatively associated with the remote fluid indicator, wherein the optical sensor does not physically contact the remote fluid indicator.

In some examples, the remote fluid indicator comprises a tape indicator, the detectable alteration comprises a color change, and/or the optical sensor comprises a colorimetric reflective optical sensor. In some examples, the wicking material comprises a woven material or a nylon mesh fiber material. In some examples, the wicking material is attached to a surface at the first location by a hydrophilic adhesive, and the wicking material and the hydrophilic adhesive can have a maximum combined thickness of about 120 µm at the first location. In some examples, the wicking material at the first location is proximate to a fluid-sensitive element, such as an imaging or viewing surface that is about 100 to about 1000 µm from an optical objective. The system can further comprise a communication component coupled to the optical sensor to produce a signal when the optical sensor detects the detectable alteration. In some examples, the fluid contacting the wicking material has a volume of about 1 to about 500 µL.

Aspects of the disclosure encompass a fluid analysis system. The system comprises a fluidic device, wherein a portion of the fluidic device is disposed at a first location. The system further comprises a wicking material extending from the first location to a second location remote from the first location. The system further comprises a remote fluid indicator at the second location, wherein the remote fluid indicator contacts a portion of the wicking material at the second location, wherein a detectable alteration to the remote fluid indicator is produced when fluid contacts the remote fluid indicator. The system further comprises an optical sensor to detect the detectable alteration, where the optical sensor does not physically contact the remote fluid indicator.

In some examples, the system further comprises a fluid cartridge with a fluid channel, wherein the fluidic device is disposed within the fluid cartridge and connected to the fluid channel at the first location, and wherein the wicking material and the second location are disposed within the fluid cartridge. In some examples, the system further comprises an optical objective to optically analyze fluid within the fluidic device, wherein the optical objective is positioned about 100 to about 1000 µm from an imaging or viewing surface of the fluidic device. The system can further comprise a second wicking material surrounding the fluidic device, wherein the remote fluid indicator contacts a portion of the second wicking material at the second location. In some examples, a portion of the fluid channel adjacent to the first location is inclined toward the first location.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various examples of the subject matter of this disclosure. In the drawings, like reference numbers indicate identical or functionally similar elements.

DETAILED DESCRIPTION

Figure 1:
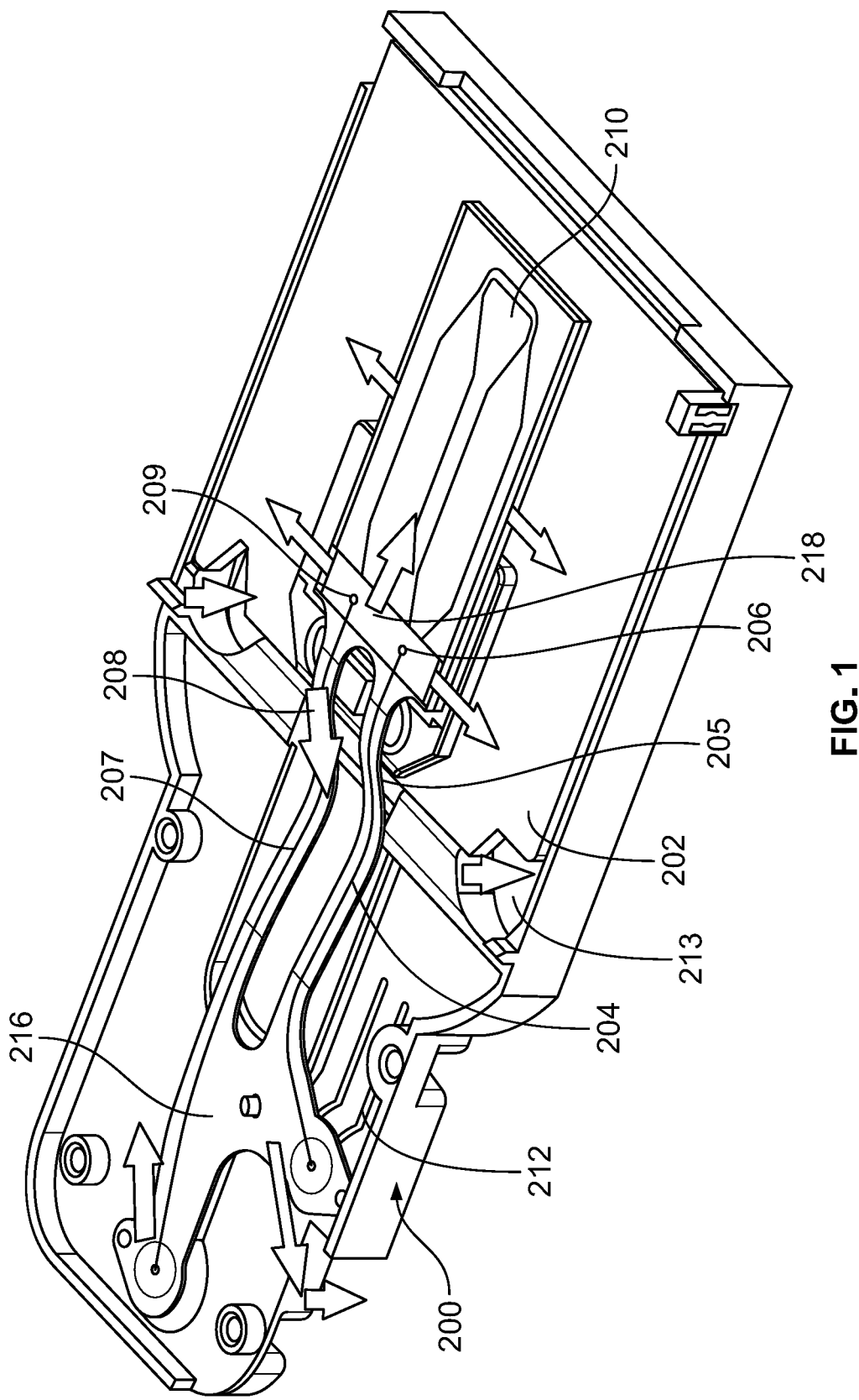
FIG. 1 is a perspective view of a cartridge for a fluid analysis apparatus.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or examples so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an example implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the term "proximate" refers to being near, adjoining, or separated by a relatively or functionally small distance or space. For example, a first object that is proximate to a second object can be in contact with the second object or can be within a distance of the second object such that the distance or space from the first object to the second object allows for the two objects to serve their respective functions or exhibit their respective characteristics in accordance with this disclosure.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the examples described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

According to various examples, assemblies and devices as described herein may be used in combination with a fluid cartridge that may comprise one or more fluid processing passageways including one or more elements, for example, one or more of a channel, a branch channel, a valve, a flow splitter, a vent, a port, an access area, a via, a bead, a reagent containing bead, a cover layer, a reaction component, any combination thereof, and the like. Any element may be in fluid communication with another element.

All possible combinations of elements and components described in the specification or recited in the claims are contemplated and considered to be part of this disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects.

The term "fluid communication" means either direct fluid communication, for example, two regions can be in fluid communication with each other via an unobstructed fluid processing passageway connecting the two regions or can be capable of being in fluid communication, for example, two regions can be capable of fluid communication with each other when they are connected via a fluid processing passageway that can comprise a valve disposed therein, wherein fluid communication can be established between the two regions upon actuating the valve, for example, by dissolving a dissolvable valve, bursting a burstable valve, or otherwise opening a valve disposed in the fluid processing passageway.

There is a need for an improved fluid management system capable of detecting the presence of fluid, such as leaked fluid that has escaped a fluid retention boundary, in small spaces, particularly spaces with or proximate to sensitive components. A fluid retention boundary may comprise a channel, vessel, chamber, compartment, or receptacle, or some combination thereof, or an interface between any two or more fluid channels, vessels, chambers, compartments, or receptacles and may be part of a fluidic device, such as a device in which fluid is contained and/or within which or through which fluid flows. Aspects of the disclosure encompass systems, methods, and apparatuses that detect such fluids and protect such components by drawing fluid from a first location to a second location via at least one wicking material, where a remote fluid indicator is positioned at or proximate to the second location.

In some examples, the first location is at or proximate to components related to fluids. In some examples, the first location is proximate to one or more fluid flow or fluid retention devices, such as fluid channels, fluid ports, fluid containers, or other fluidic devices. In some examples, the first location is proximate to a fluid interface between two or more fluid flow or fluid retention devices. These fluid-related components, such as fluid devices and fluid interfaces, are comprised of fluid retention boundaries, and a fluid that escapes a fluid retention boundary constitutes a leaked fluid. Thus, such fluid devices and fluid interfaces may be sources of a potential fluid leak, for example, a fluid leak caused by seepage, clogs, corrosion, deterioration, pressure, temperature, an assembly failure, mechanical stress, or other condition that may cause a fluid leak. For example, the fluid leak can result from damage, malfunction, or other changed condition of fluid related parts, such as seals or connections between fluid ports and/or channels.

In some examples, the first location is at or proximate to one or more sensitive components. In some examples, the sensitive component is a fluid-sensitive component such as a component that experiences diminished efficacy, malfunctions, sustains damage, or exposes other components to damage when exposed to fluid. In some examples, the sensitive component is a deposit-sensitive component such as a component that experiences diminished efficacy, malfunctions, sustains damage, or exposes other components to damage due to deposits that remain on the component as a result of exposure to a fluid. In some examples, the first location is at or near an imaging or viewing system component, such as an objective or lens, an illuminator or lighting element (e.g., a laser diode light source for the optical measurement within the fluid system), an aperture, a condenser, an imaging or viewing surface, a thermal element such as a thermocycler, a filter, a mirror, a camera, a linear positioning stage, actuators, or other optical element. In some examples, the first location is proximate to a power supply unit, a computer/circuit board/chip, a motor, a gear, a bearing, or other power transmission element. In some examples, the sensitive component is an electrical component.

In some examples, the first location exhibits space constraints. For example, the first location can encompass a small gap between adjacent components or adjacent portions of a single component, a depression, or an aperture. The space constraint can be proximate to one or more of a fluid device, a fluid interface, and/or a sensitive component. The space constraint can relate to a space between one or more of a fluid device, a fluid interface, and/or a sensitive component. For example, the space constraint can relate to a space between an imaging or viewing surface and an optical objective. In some examples, the space constraint can relate to a small gap, such as a gap of less than 2500 μm or a gap between about 50 μm to about 2500 μm. In some examples, the space constraint can relate to a gap of more than 2500 μm. In some examples, the space constraint comprises a width of about 100 μm to about 2500 μm, about 100 μm to about 2000 μm, about 100 μm to about 1500 μm, about 100 μm to about 1000 μm, about 100 μm to about 700 μm, about 100 μm to about 350 μm, about 100 μm to about 240 μm, about 100 μm to about 180 μm, or about 50 μm to about 100 μm. In some examples, the space constraint comprises a maximum width of about 2500 μm, about 2000 μm, about 1500 μm, about 1000 μm, about 700 μm, about 500 μm, about 350 μm, about 300 μm, about 250 μm, about 200 μm, about 150 μm, about 100 μm, or about 50 μm.

In some examples, a wicking material comprises a woven material and/or a nonwoven material. In some examples, a wicking material comprises a hydro-entangled material. In some examples, a wicking material comprises a hydrophobic material and/or a hydrophilic material. In some examples, a wicking material comprises a nylon mesh fiber material. In some examples, a wicking material comprises pores, such as pores sized to increase or optimize the wicking performance of the wicking material, and such pores can be sized on the scale of pm, nm, μm, or mm. For example, a wicking material can comprise pores of about 0.01 μm, about 0.1 μm, about 0.25 μm, about 0.5 μm, about 0.75 μm, about 1 μm, about 5 μm, about 10 μm, about 20 μm, about 40 μm, about 60 μm, about 80 μm, about 100 μm, about 125 μm, about 150 μm, about 175 μm, about 200 μm, about 225 μm, about 250 μm, about 300 μm, about 400 μm, about 500 μm, about 600 μm, about 700 μm, about 800 μm, about 1000 μm. For example, a nylon mesh fiber wicking material can comprise pores of about 80 μm. In some examples, a wicking material comprises one material or a combination of two or more materials. For example, a wicking material can comprise one or more of the following materials: polyester, cellulose, polyethylene (PE), polypropylene (PP), polytetrafluoroethylene (PTFE), polyethersulfone (PES), and/or nylon. In some examples, a wicking material comprises a first material and a second material in amounts of, respectively, about 90% and about 10%, about 80% and about 20%, about 70% and about 30%, about 60% and about 40%, about 50% and about 50%, about 40% and about 60%, about 30% and about 70%, about 20% and about 80%, or about 10% and about 90%. For example, a wicking material can comprise polyester and/or cellulose, such as about 50% polyester and about 50% cellulose. For example, a wicking material can comprise TechniCloth® TX604 cleanroom wipe made by Texwipe®. In some examples, a wicking material can comprise liquid chromatography paper. The wicking material can be designed to shed minimal particulates, including during application of the wicking material to an adhesive or surface or during wetting of the wicking material. In some examples, a wicking material is not compromised by exposure to fluid, high or low temperatures, humidity, or corrosive chemicals. In some examples, the wicking material comprises more than one wicking material, and the more than one wicking materials can be adjacent or layered.

In some examples, a second location can be remote from the first location. For example, the second location can be separated from the first location by a distance of at least about 0.5 mm, 1 mm, 1.5 mm, 2 mm, 3 mm, 4 mm, 5 mm, 7.5 mm, 10 mm, 25 mm, 50 mm, 75 mm, 100 mm, 150 mm, 200 mm, 250 mm, 300 mm, 350 mm, 400 mm, 450 mm, or 500 mm. In some examples, the second location may not be proximate to one or more sensitive components and/or fluid components at or proximate to the first location. For example, a location or component that is not proximate to a second location or component can be separated from the second location or component by a distance of about 0.01 mm, 0.05 mm, 0.1 mm, 0.25 mm, 0.5 mm, 0.75 mm, 1 mm, 1.5 mm, 2 mm, 3 mm, 4 mm, 5 mm, 7.5 mm, 10 mm, 25 mm, 50 mm, 75 mm, 100 mm, 150 mm, 200 mm, 250 mm, 300 mm, 350 mm, 400 mm, 450 mm, 500 mm, or more than 500 mm.

In some examples, the second location may not exhibit the space constraint exhibited by the first location or the second location may exhibit less space constraints than the first location. For example, the second location can exhibit one or more widths that are greater than one or more widths exhibited by the first location. In some examples, the second location can be sized to accommodate components that do not fit in the first location due to space constraints, for example, components such as liquid indicators and/or sensor components.

In some examples, a remote fluid indicator may be at or proximate to the second location. For example, a remote fluid indicator can be attached to a surface at the second location. In some examples, contact between a remote fluid indicator and a fluid can produce or cause to be produced one or more detectable alterations to the remote fluid indicator. For example, a detectable alteration may be a change in some quality or characteristic of the remote fluid indicator. For example, a detectable alteration may be a change in color, size, conductivity, resistivity, or other optical, electrical, mechanical, electromagnetic, magnetic, electrostatic, inductive, capacitive, or thermal property. In some examples, the detectable alteration occurs or is substantially completed in less than about 120 seconds, about 100 seconds, about 80 seconds, about 60 seconds, about 40 seconds, about 20 seconds, about 10 seconds, about 5 seconds, about 1 second, about 0.5 seconds, about 0.25 seconds, about 0.1 seconds, about 0.05 seconds, or about 0.01 seconds after a fluid contacts the remote fluid indicator. In some examples, a detectable alteration may be irreversible. A tape indicator is an example of a remote fluid indicator. In some examples, a remote fluid indicator may not be sensitive to high or low temperatures and/or humidity.

One or more wicking materials can extend from the first location to the second location. A wicking material can extend directly between the two locations or can extend indirectly between the two locations, for example, such that at least one portion of the wicking material initially extends away from the first location and not in the direction of the second location. In some examples, one or more wicking materials extend from the first location to locations other than the second location. In some examples, a first wicking material extends from the first location to a second wicking material, and the second wicking material can extend to the second location.

A portion of the wicking material can be disposed at the first location adjacent or proximate to one or more fluid devices or fluid interfaces. A portion of the wicking material can be disposed at the first location adjacent or proximate to one or more sensitive components. In some examples, a portion of the wicking material can be disposed at the first location in a space between, adjacent to, or proximate to one or more of a fluid device, a fluid interface, and/or a sensitive component, and the space can exhibit a space constraint as discussed above, such as a width as discussed above. In some examples, a portion of the wicking material can be positioned at the first location such that fluid from a fluid device or fluid interface, such as fluid leaked from a fluid device or fluid interface, contacts the wicking material.

A portion of the wicking material can be disposed at the second location adjacent or proximate to one or more remote fluid indicators. For example, a portion of the wicking material at the second location can extend below or over a remote fluid indicator and/or may abut the side of a remote fluid indicator. In some examples, a portion of the wicking material can be positioned at the second location such that fluid in or on the wicking material contacts a remote fluid indicator.

In some examples, a wicking material can be attached to a surface by one or more adhesives. For example, one or more adhesives can attach a wicking material to a surface at the first location, to a surface at the second location, and/or to a surface extending from the first location to the second location. In some examples, other components described herein, such as a fluid device or a remote fluid indicator, are attached to one or more surfaces by one or more adhesives. In some examples, the adhesive can be hydrophilic. In some examples, the adhesive is not compromised by exposure to fluid, high or low temperatures, humidity, or corrosive chemicals. In some examples, the adhesive can be a double-sided tape or a single-layer transfer tape. For example, a suitable adhesive may include ARflow® 93049 Hydrophilic Pressure-Sensitive Adhesive made by Adhesives Research®. In some examples, a single-layer transfer tape adhesive attaches a portion of a wicking material to a surface at the first location, and the surface can exhibit a space constraint as discussed above, such as a width as discussed above.

In some examples, the wicking material exhibits a thickness of less than about 1000 μm, e.g., about 500 μm, about 450 μm, about 400 μm, about 350 μm, about 300 μm, about 250 μm, about 200 μm, about 150 μm, about 120 μm, about 100 μm, about 80 μm, about 50 μm, about 25 μm, or about 10 μm. In some examples, the adhesive exhibits a thickness of less than about 1000 μm, about 500 μm, about 450 μm, about 400 μm, about 350 μm, about 300 μm, about 250 μm, about 200 μm, about 150 μm, about 120 μm, about 100 μm, about 80 μm, about 50 μm, about 25 μm, or about 10 μm. In some examples, the combined thickness of the wicking material and the adhesive exhibits a thickness of less than about 1000 μm, e.g., about 750 μm, about 600 μm, about 500 μm, about 450 μm, about 400 μm, about 350 μm, about 300 μm, about 250 μm, about 200 μm, about 150 μm, about 120 μm, about 100 μm, about 80 μm, or about 50 μm.

In some examples, a minimum amount of fluid at the first location can be sufficient to be drawn via the wicking material to the second location to contact the remote fluid indicator to produce the detectable alteration. In some examples, the minimum amount of fluid can be about 500 μL, about 450 μL, about 400 μL, about 350 μL, about 300 μL, about 250 μL, about 200 μL, about 150 μL, about 100 μL, about 80 μL, about 60 μL, about 40 μL, about 20 μL, about 10 μL, or about 1 μL. In some examples, the amount of fluid contacting the wicking material has a volume of about 1 μL, about 50 μL, about 100 μL, about 250 μL, about 500 μL, about 1000 μL, about 1500 μL, about 2000 μL, about 3000 μL, about 4000 μL, about 5000 μL, or more than about 5000 μL. In some examples, the amount of fluid contacting the wicking material (e.g., contacting the wicking material at the first location) has a volume of about 1 μL to about 1000 μL, about 1 μL to about 500 μL, about 1 μL to about 450 μL, about 1 μL to about 400 μL, about 1 μL to about 350 μL, about 1 μL to about 300 μL, about 1 μL to about 250 μL, about 1 μL to about 200 μL, about 1 μL to about 150 μL, or about 1 μL to about 100 μL.

In some examples, a sensor can be operatively associated with the remote fluid indicator. For example, the sensor can detect the detectable alteration to the remote fluid indicator. In some examples, the sensor does not physically contact the remote fluid indicator. In some examples, the sensor can be an optical sensor, photoelectric sensor, or electrical sensor. In some examples, a sensor, such as an optical sensor, can be operatively associated with the remote fluid indicator via an optical fiber. In some examples, the sensor can be a water vapor or humidity sensor, capacitance sensor, or inductive sensor. In some examples, the sensor can be a colorimetric reflective optical sensor. The colorimetric reflective optical sensor can comprise a light source and an optical color detector mounted on a circuit board.

In some examples, a communication component can be coupled to the sensor. For example, a communication component can be operatively associated with the sensor via a wired connection or a wireless connection. The communication component can produce a signal when the optical sensor detects the detectable alteration. In some examples, the signal can be an electronic signal, and the electronic signal can be sent to a system component capable of triggering a functional response to the detection of fluid, such as activating an alarm, stopping fluid flow to a fluid device at the first location, and/or removing fluid from a fluid device at the first location. In some examples, a communication component can comprise or be connected to a computer or processing system, such as a computer or processing system in a fluid analysis apparatus. A communication component may be implemented via one or more logic elements, e.g., a computer, embedded controller, application specific integrated circuit, etc., and may include or access data storage memory, which may include random access memory (RAM), read only memory (ROM), flash memory, and other types of memory now known or later developed.

Aspects of the disclosure also encompass a consumable cartridge or carrier plate that can be installed in a fluid analysis apparatus and that comprises one or more components of the systems described above. In some examples, the fluid analysis apparatus can be an apparatus for optical analysis (e.g., imaging) or chemical analysis. In some examples, one or more of the following can be disposed in the cartridge or carrier plate: a fluid device or a portion of a fluid device; an interface between two or more fluid devices; a first location; a second location and a remote fluid indicator; a wicking material or a portion of a wicking material; and/or a sensor. In some examples, a cartridge comprises a fluid device, at least one fluid channel or fluid port connected to the fluid device at a fluid interface, a first location proximate to the fluid interface between the fluid device and the fluid channel, a remote fluid indicator at a second location in the cartridge remote from the first location, and a wicking material that extends from the first location to the second location. In some examples, the fluid analysis apparatus comprises a sensor operatively associated with a remote fluid indicator located in a cartridge that can be installed in the apparatus, and the sensor can be mounted in the apparatus outside of the cartridge and/or positioned such that the sensor does not contact the remote fluid indicator. In some examples, after a leak occurs or is detected in a cartridge installed in the apparatus (e.g., a fluid contacts a wicking material and/or remote fluid indicator disposed in the cartridge), then the cartridge can be removed from the apparatus and replaced with a similar cartridge in which a leak has not occurred or been detected, and the sensor can remain in place for reuse, for example without requiring cleaning of the sensor.

Aspects of the disclosure also encompass methods related to the systems described above. In some examples, after fluid escapes a fluid retention boundary at a first location (e.g., the fluid is leaked from a fluid flow or fluid retention device or is leaked at an interface between two or more fluid devices), the fluid can be contacted with a portion of a wicking material at or proximate to the first location. The wicking material can extend from the first location to a second location, and the fluid can be drawn from the first location to the second location via the wicking material. In some examples, the fluid is then contacted with a remote fluid indicator in contact with the wicking material at the second location. A detectable alteration to the remote fluid indicator can then be produced as a result of contacting the fluid with the remote fluid indicator. In some examples, the detectable alteration can be then detected by an optical sensor operatively associated with the remote fluid indicator.

As shown in FIG. 1, an example cartridge 200 for a fluid analysis apparatus comprises fluid components such as a first fluid channel 204 that connects to fluidic device 210 via first fluid port 206 and a second fluid channel 207 that connects to fluidic device 210 via second fluid port 209. For example, fluid can flow through first fluid channel 204, through first fluid port 206 into fluidic device 210, through second fluid port 209 into and through second fluid channel 207. First and second fluid channels 204, 207 are formed within a channel laminate 216 encasing the fluid channels. Cartridge 200 further comprises a carrier plate 202, and fluidic device 210 can be positioned on carrier plate 202. The connection between first and second fluid channels 204, 207 and fluidic device 210 includes a portion 218 of the channel laminate 216 extending across the fluidic device 210 and forms a fluid interface (comprising, for example, first and second fluid ports 206, 209) between a fluid channel within the fluidic device 210 and first and second fluid channels 204, 207.

In one example, the cartridge 200 may be placed in a processing instrument, such as a cartridge interface module (e.g., an assembly with automated motors, gears, and interfaces that connect with the cartridge fluidic system). Motors and bearings within such a module may include power transmission elements used to actuate the functions within the cartridge or for manipulating the cartridge.

Although not intended to be limiting, as related to the present disclosure, a "first location" encompasses a location that can be (1) proximate to a portion of wicking material, (2) proximate to one or more of a fluid device, a fluid interface, and/or a sensitive component, and (3) remote from a remote fluid indicator. As shown in FIGS. 2-6, the "first location" can be a location that is (1) proximate to a portion of wicking material (e.g., wicking material 220, 220', and/or 226), (2) proximate to portion 218 of channel laminate 216 including a portion of first fluid channel 204 connected to fluidic device 210, first fluid port 206, a portion of second fluid channel 207 connected to fluidic device 210, second fluid port 209, and/or a portion of fluidic device 210 connected to first fluid channel 204 or connected to second fluid channel 207, and (3) remote from the remote fluid indicator 228. In general, the terms "first location" and "second location" are intended to convey two different locations that are physically remote from each other (e.g., not in direct physical contact with each other).

Figure 2:
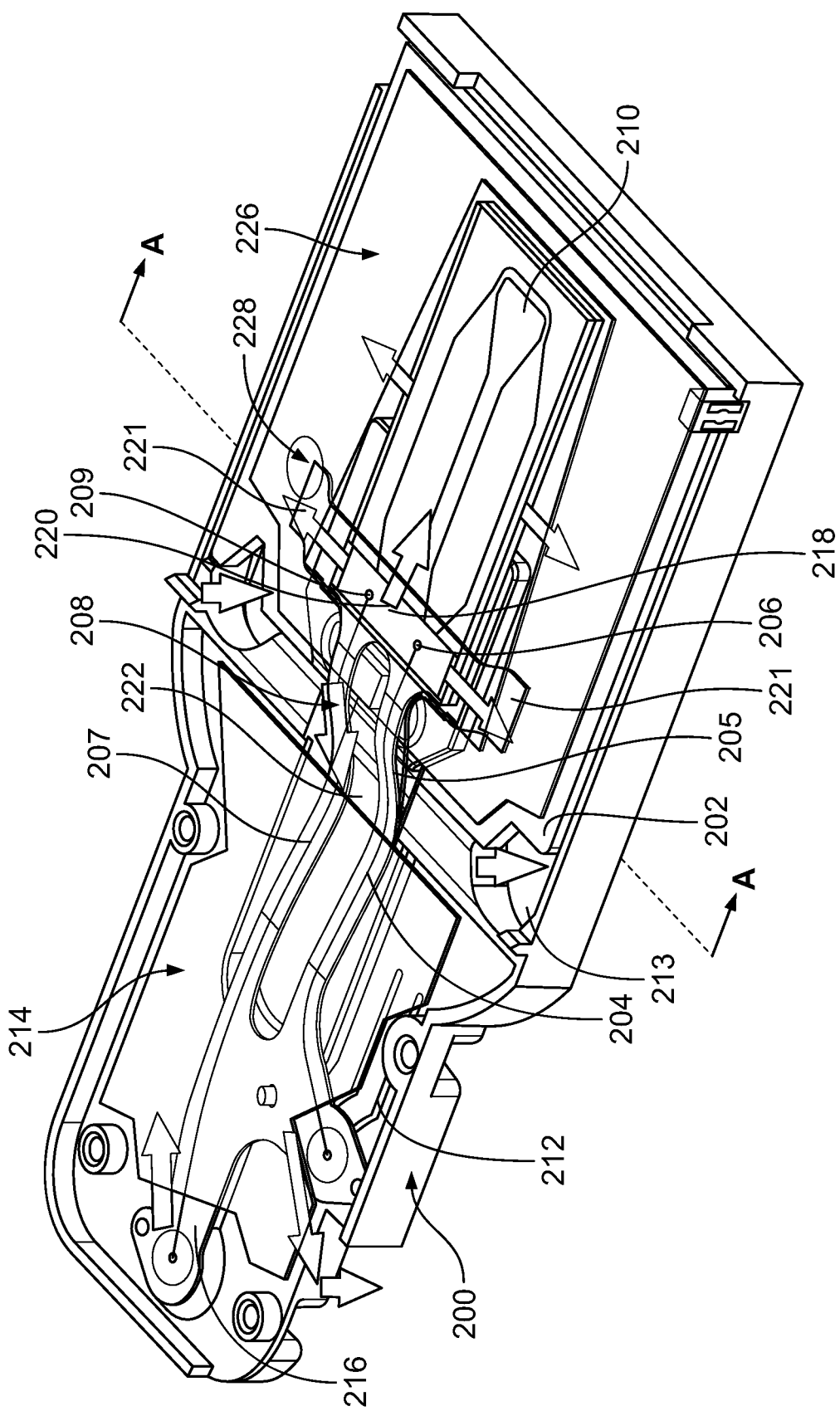
FIG. 2 is a perspective view of a cartridge with a fluid detection system for a fluid analysis apparatus.

As shown in FIG. 2, the cartridge 200 comprises a first wicking material 220. The first wicking material 220 extends from a first location—proximate to the fluid interface between fluid channels 204, 207 and fluidic device 210 (comprising first and second fluid ports 206, 209)—to a second location remote from the first location. A remote fluid indicator 228 can be positioned at the second location and contacts a portion of first wicking material 220 at the second location. Fluid leaked proximate to the first location from, for example, first fluid channel 204, second fluid channel 207, fluidic device 210, or the interface between these fluid components (comprising first and second fluid ports 206, 209) contacts the first wicking material 220 at the first location, which draws the fluid from the first location to the second location, where the fluid contacts remote fluid indicator 228. In the implementation shown, the remote fluid indicator 228 can be a color-changing tape indicator that irreversibly changes color upon contact with fluid, though other remote fluid indicators 228 that can reversibly or irreversibly change may be utilized.

As shown in FIG. 2, the cartridge 200 further comprises a second wicking material 226. The second wicking material 226 can be disposed on carrier plate 202 surrounding fluidic device 210, including proximate to the portion of fluidic device 210 connected to first and second fluid channels 204, 207. The second wicking material 226 can be also disposed at the second location and contacts the remote fluid indicator 228. Fluid leaked proximate to the first location or fluid leaked from the fluidic device 210 anywhere on the carrier plate 202 contacts the second wicking material 226, which draws the fluid to the remote fluid indicator 228.

As shown in FIG. 2, in one example, the wicking material 220 is in a "T" configuration with a cross segment 221 and a longitudinal segment 222. One end of the cross segment 221 extends from portion 218 of channel laminate 216 to beyond one side of the fluidic device 210 to the remote fluid indicator 228 to facilitate detection of the fluid leak at the first location. The opposite end of the cross segment 221 extends from portion 218 of channel laminate 216 to beyond an opposite side of the fluidic device 210 opposite the remote fluid indicator 228 at the second location and contacts a portion of the second wicking material 226 to help draw fluid away from the source of the leak at the first location and to thereby protect fluid-sensitive components.

As shown in FIGS. 1 and 2, in one example, channel laminate 216 comprises a first channel laminate incline portion 205 and a second channel laminate incline portion 208, which slope downward away from the fluidic device 210, portion 218 of channel laminate 216, and carrier plate 202. Leaked fluid from the first location can flow down the first channel laminate incline portion 205 and second channel laminate incline portion 208, away from the first location, fluidic device 210, and carrier plate 202 and down into a lower portion of cartridge 200 where it may be absorbed by an optional absorbent pad 214, which can comprise a material designed to absorb and hold fluid.

As shown in FIG. 2, the first wicking material 220 can comprise a longitudinal segment 222. The longitudinal segment 222 extends downward and away from carrier plate 202 and the connections between first and second fluid channels 204, 207 and fluidic device 210. The longitudinal segment 222 extends down into a lower portion of cartridge 200 away from carrier plate 202 and may contact absorbent pad 214. The longitudinal segment 222 overlies the first and second channel laminate incline portions 205, 208. The longitudinal segment 222 wicks leaked fluid from the first location, fluidic device 210, and/or carrier plate 202 down into a lower portion of cartridge 200 where it may be absorbed by the absorbent pad 214 and/or otherwise away from the first location and corresponding components.

As shown in FIG. 2, cartridge 200 may comprise, either in addition to or in lieu of the absorbent pad 214, at least one drain aperture 212. Excess fluid in cartridge 200, such as fluid that is not absorbed by the first wicking material 220, the second wicking material 226, and/or the absorbent pad 214, can drain out of cartridge 200 through drain aperture 212. In some examples, a drain pan (not shown) can be positioned (e.g., positioned below cartridge 200) to receive fluid that drains out of cartridge 200 through drain aperture 212 or fluid leaked from other components of a cartridge interface module. Such a drain pan can comprise a wicking material, remote fluid indicator, sensor, and/or absorbent pad. Cartridge 200 may further comprise at least one pin hole 213 that registers with a pin (not shown), such as a loading pin or datum pin in a cartridge interface module, and in some examples the pin can be a sensitive component.

Figure 3:
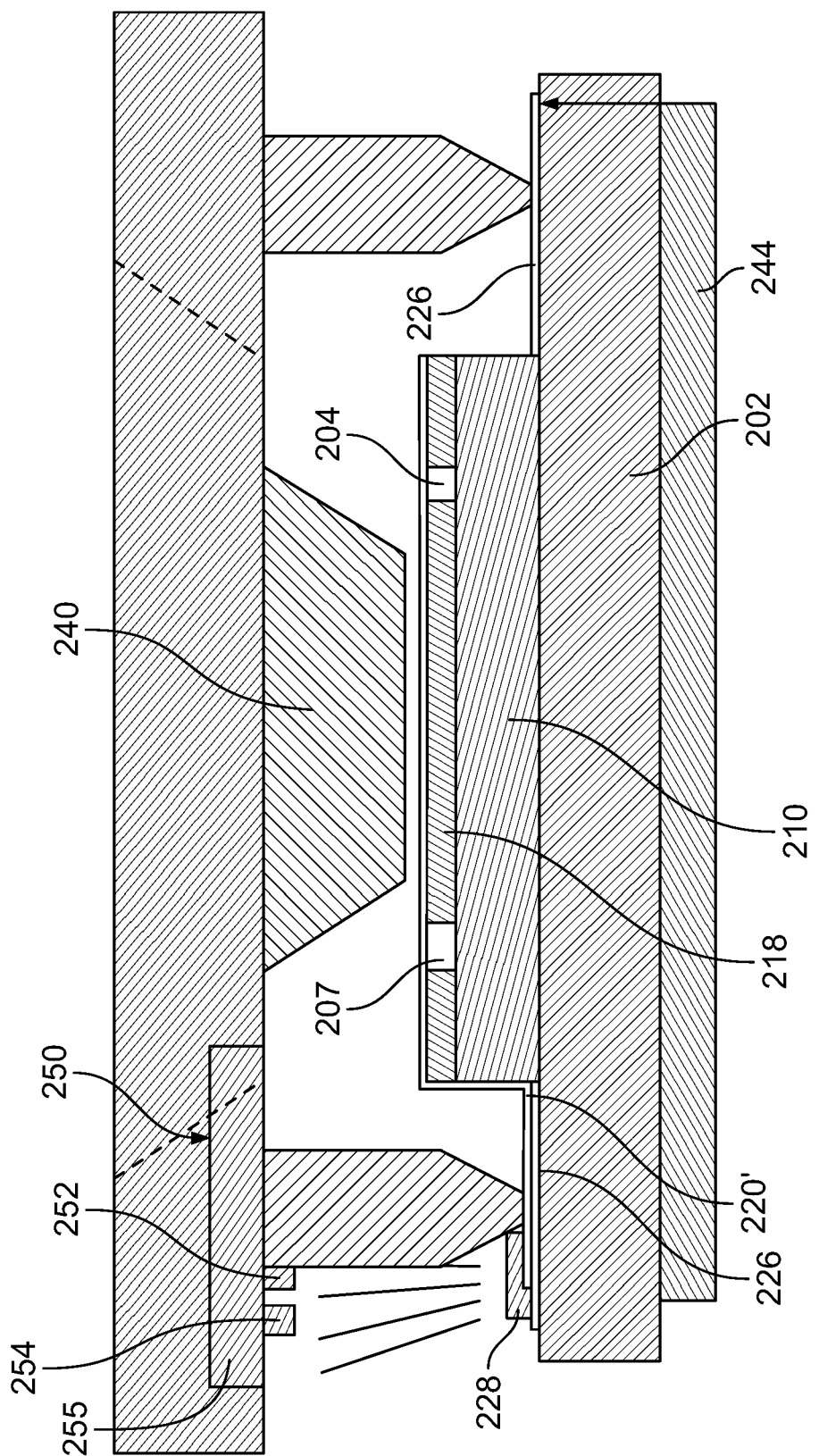
FIG. 3 is a cross-sectional view of a fluid detection system similar to the system in FIG. 2 for a fluid analysis apparatus, taken along the line A-A in FIG. 2.

FIG. 3 shows a cross-sectional view of a leak detection system similar to the system in FIG. 2, taken along the line A-A in FIG. 2. As shown in FIG. 3, a first location can be proximate to a portion of fluidic device 210, portions of first and second fluid channels 204, 207 connected to fluidic device 210, portion 218 of channel laminate 216, and/or objective 240, and the first location may exhibit a space constraint between the bottom of objective 240 and the top of portion 218 of channel laminate 216. First wicking material 220' extends from the first location, including the portion of the first location that exhibits the space constraint, to the remote fluid indicator 228 at a second location remote to the first location. First wicking material 220' of FIG. 3 does not include a cross segment 221 extending beyond an opposite side of the fluidic device 210 opposite the remote fluid indicator 228 or a longitudinal segment 222. The second location does not exhibit the space constraint exhibited between the objective 240 and portion 218 of channel laminate 216. Fluid leaked proximate to the first location, including fluid leaked in the portion of the first location that exhibits the space constraint, is drawn by first wicking material 220' to the second location, where the fluid contacts remote fluid indicator 228, which then undergoes a detectable change of a characteristic thereof. Second wicking material 226 can be disposed on carrier plate 202 surrounding fluidic device 210 and extends to the remote fluid indicator 228 at the second location. Fluid leaked proximate to the first location, fluid leaked around fluidic device 210, and/or fluid in the first wicking material 220' contacts the second wicking material 226, which draws the fluid to the second location, where the fluid contacts remote fluid indicator 228, which then undergoes a detectable change in a characteristic thereof.

As shown in FIG. 3, optical sensor 250 comprises a light source 254 (e.g., an LED) and color sensor 252 (e.g., a photo diode) connected to a printed circuit board 255. When remote fluid indicator 228 changes color, the incident light from light source 254 is absorbed or reflected differently, and the difference in reflected light is detected by color sensor 252. Optical sensor 250 does not contact remote fluid indicator 228.

Figure 4:
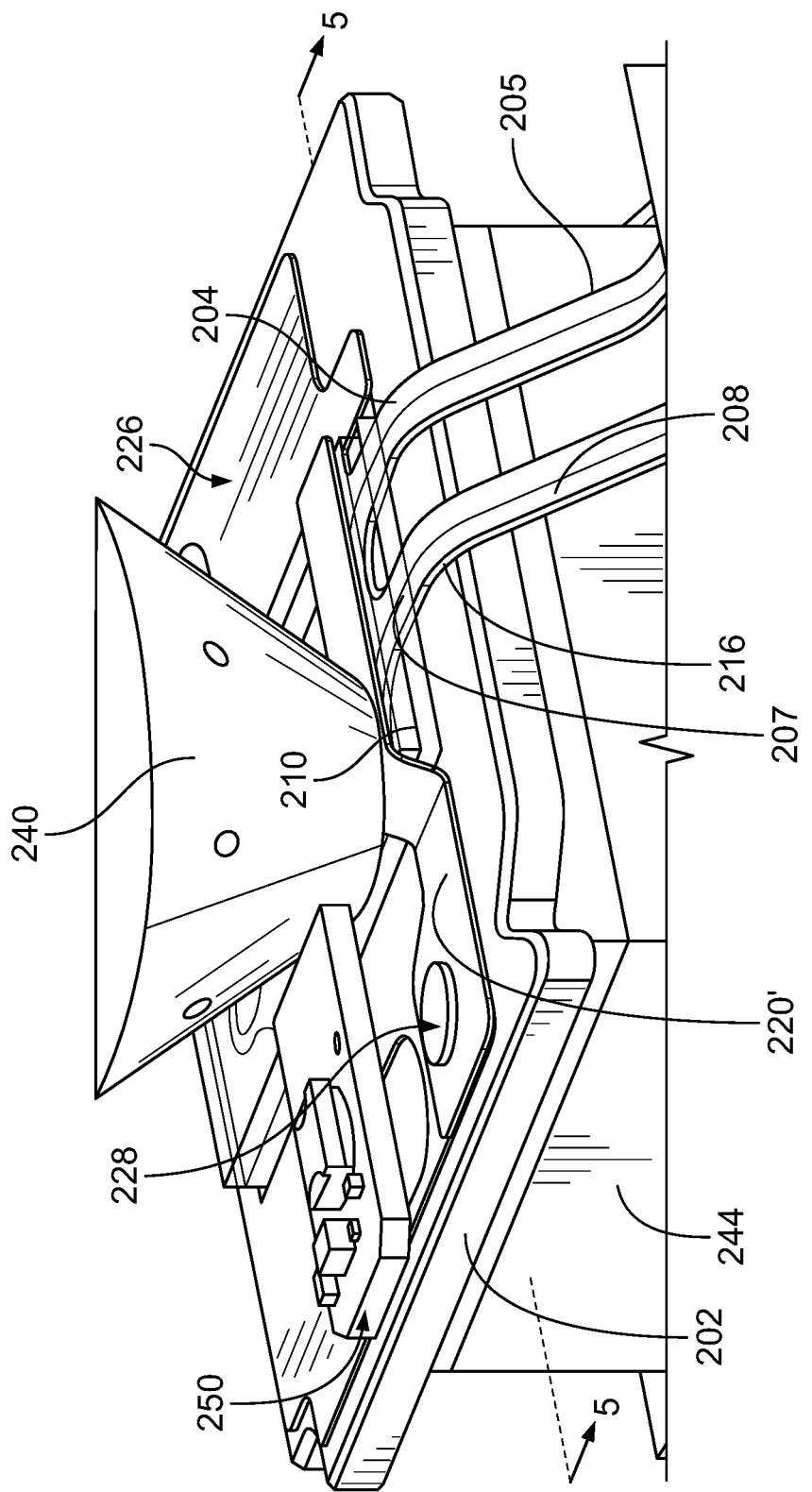
FIG. 4 is a perspective view of a fluid detection system for a fluid analysis apparatus.
Figure 5:
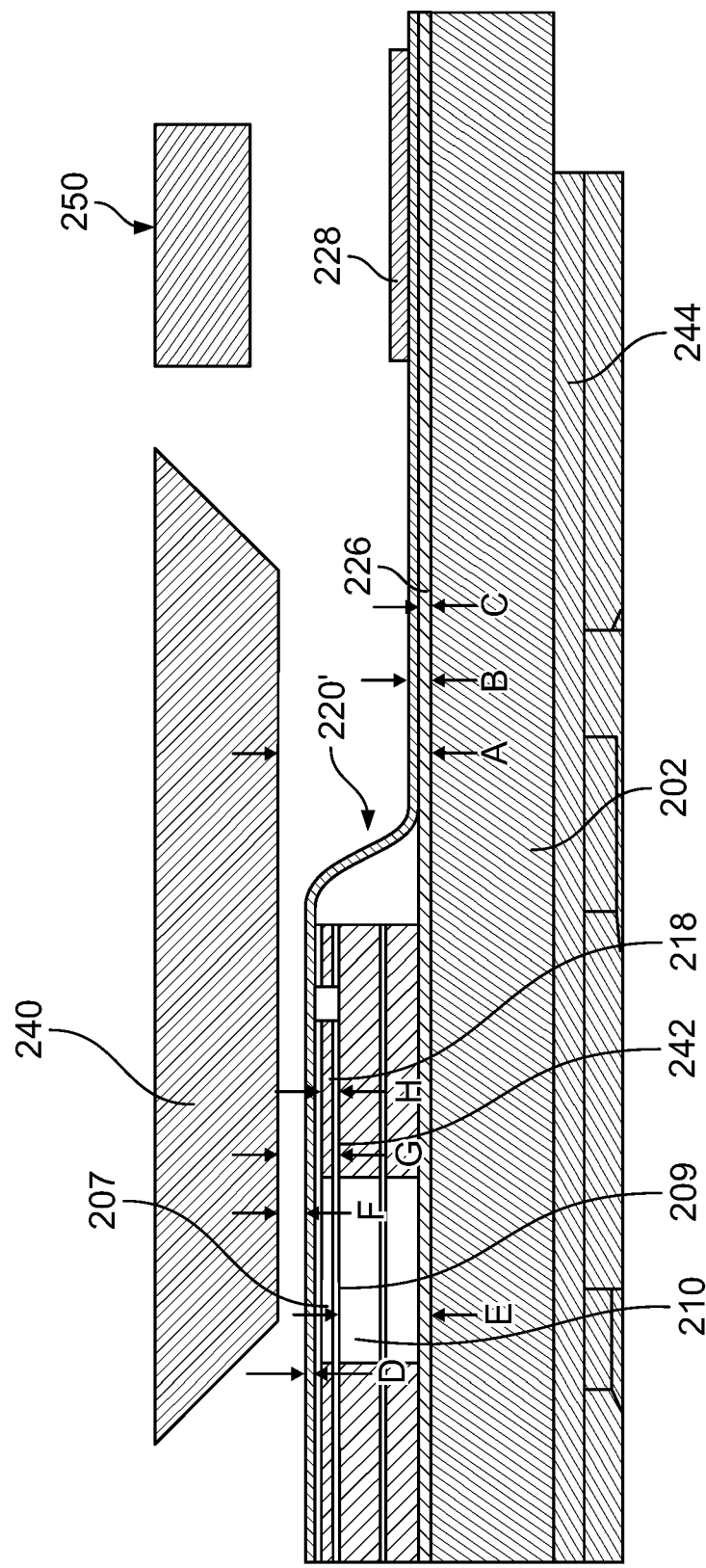
FIG. 5 is a partial cross-sectional view of the fluid detection system in FIG. 4 for a fluid analysis apparatus, taken along the line C-C in FIG. 4.
Figure 6:
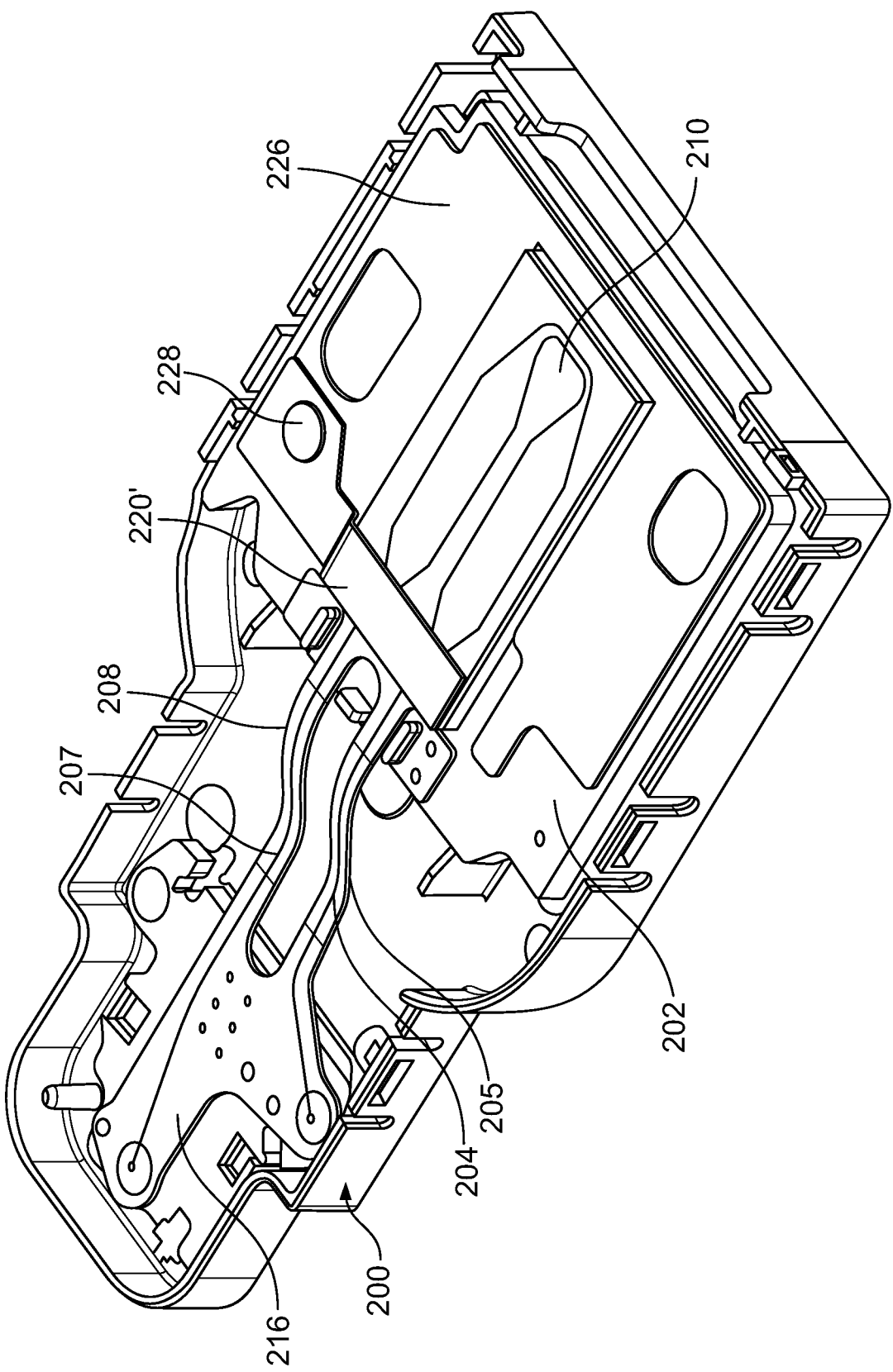
FIG. 6 is a perspective view of a cartridge with the fluid detection system in FIG. 4 for a fluid analysis apparatus.

FIGS. 4-6 show a leak detection system similar to the system in FIG. 2. As shown in FIGS. 4 and 6, first and second fluid channels 204, 207 connect to fluidic device 210, which is positioned on carrier plate 202. FIGS. 4 and 5 depict only a portion of the cartridge 200, with other portions removed for clarity. Below carrier plate 202 and outside of cartridge 200 is thermal element 244, such as a Peltier thermoelectric cooler, which can be part of the fluid analysis apparatus. In other implementations, the thermal element 244 may be contained within the cartridge 200 and controlled by the fluid analysis apparatus responsive to the cartridge 200 being installed or inserted into the fluid analysis apparatus. The example fluid analysis apparatus comprises optical objective 240, which can be mounted outside of cartridge 200 and can be positioned over an imaging or viewing surface portion of the top of fluidic device 210. In addition, although only objective 240 and thermal element 244 are shown, the fluid analysis apparatus may include several other components for analysis of material within the fluidic device 210. First wicking material 220' extends from a first location—e.g., proximate to one or more of a portion of fluidic device 210, portions of first and second fluid channels 204, 207 connected to fluidic device 210, the fluid interface between fluidic device 210 and first and second fluid channels 204, 207 (comprising first and second fluid ports 206, 209, not labeled in FIG. 4 or 6), and/or objective 240—to remote fluid indicator 228 at a second location remote from the first location. In the example of FIGS. 4-6, first wicking material 220' does not include a cross segment 221 extending beyond an opposite side of the fluidic device 210 opposite the remote fluid indicator 228, and first wicking material 220' does not include a longitudinal segment, such as longitudinal segment 222 in FIG. 2, disposed over the first and second channel laminate incline portions 205, 208. Second wicking material 226 can be disposed on carrier plate 202 surrounding fluidic device 210 and extends to remote fluid indicator 228 at the second location. First wicking material 220' and second wicking material 226 draw fluid from the first location and from around fluidic device 210 to remote fluid indicator 228 such that a leak can be detected before leaked fluid contacts or damages sensitive components such as the objective 240, the imaging or viewing surface portion of the top of fluidic device 210, or the thermal element 244. Also, by drawing leaked fluid away from sensitive components, such as the objective 240 and the imaging or viewing surface portion of the top of fluidic device 210, wicking materials, such as first wicking material 220', passively protect the sensitive components from the leaked fluids. In some examples, leaked fluid that is not absorbed by wicking material, or that oversaturates the wicking material, can flow down the first and second channel laminate incline portions 205, 208 of channel laminate 216 and away from the first location and carrier plate 202.

As shown in FIGS. 4 and 5, optical sensor 250 can be proximate to remote fluid indicator 228 but does not contact remote fluid indicator 228. Optical sensor 250 can be mounted in the fluid analysis apparatus outside of cartridge 200.

FIG. 5 shows a partial cross-sectional view of the leak detection system in FIG. 4, taken along the line C-C in FIG. 4. As shown in FIG. 5, a first location can be proximate to a portion of fluidic device 210, a portion of second fluid channel 207, the fluid interface between fluidic device 210 and second fluid channel 207 (comprising second fluid port 209), and/or objective 240, and the first location exhibits a space constraint between the bottom of objective 240 and the top of second fluid channel 207. First wicking material 220' extends from the first location, including the portion of the first location that exhibits the space constraint, to the remote fluid indicator 228 at a second location remote to the first location. The second location does not exhibit the space constraint exhibited between the objective 240 and second fluid channel 207. Fluid leaked proximate to the first location, including fluid leaked in the portion of the first location that exhibits the space constraint, is drawn by first wicking material 220' to the second location, where the fluid contacts remote fluid indicator 228, which then undergoes a detectable change in a characteristic thereof. Second wicking material 226 can be disposed on carrier plate 202 surrounding fluidic device 210 and extends to the remote fluid indicator 228 at the second location. Fluid leaked proximate to the first location, fluid leaked around fluidic device 210, and/or fluid in the first wicking material 220' contacts the second wicking material 226, which draws the fluid to the second location, where the fluid contacts remote fluid indicator 228, which then undergoes a detectable change in a characteristic thereof. Optical sensor 250 can be operatively associated with remote fluid indicator 228 and detects when remote fluid indicator 228 changes color.

First wicking material 220' may be a nylon mesh material and may be attached to the top surface of second fluid channel 207 and to second wicking material 226 by an adhesive, such as a hydrophilic single-layer transfer tape. Second wicking material 226 may be a 50%/50% mixture of polyester and cellulose and may be attached to the top surface of carrier plate 202 by an adhesive. Fluidic device 210 may be attached to the top surface of carrier plate 202 by an adhesive.

The thickness [D] of first wicking material 220' and its associated adhesive may be less than about 200 μm, such as about 100 μm. The thickness [C] of second wicking material 226 and its associated adhesive may be less than about 500 μm, such as about 350 μm. In some implementations, the combined thickness [B] of first and second wicking materials 220', 226 and both associated adhesives may be less than about 500 μm, such as about 450 μm. The width [A] of the space from the bottom of objective 240 to the top surface of carrier plate 202 may be less than about 2500 μm. The width [G] of the space from the bottom of objective 240 to the imaging or viewing surface 242, i.e., the top surface of fluidic device 210, may be less than about 1000 μm. The thickness [H] of second fluid channel 207 (encased in laminate) may be less than about 500 μm, such as about 400 μm, and the width of the space constraint between the bottom of objective 240 to the top surface of second fluid channel 207 may be less than about 500 μm, such as about 340 μm. Thus, when first wicking material 220' and its associated adhesive extend into the portion of the first location that exhibits the space constraint between objective 240 and second fluid channel 207, the gap [F] between the bottom of objective 240 and the top of the first wicking material 220' may be less than about 250 μm, such as about 240 μm.

It should be appreciated that all of the foregoing dimensions are examples and illustrative and are not intended to be limiting.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the subject matter of this disclosure has been described and shown in considerable detail with reference to certain illustrative examples, including various combinations and sub-combinations of features, those skilled in the art will readily appreciate other examples and variations and modifications thereof as encompassed within the scope of the present disclosure. Moreover, the descriptions of such examples, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. An apparatus, comprising:
  a cartridge, comprising:
    a channel laminate encasing a first fluid channel and a second fluid channel;
    a fluidic device comprising a first port and a second port, wherein the first fluid channel is connected to the first port at a fluid interface and the second fluid channel is connected to the second port at the fluid interface;
    a wicking material carried by the cartridge and extending between a first location and a second location, the first location being proximate to the fluid interface and the second location being remote from the first location;
    a remote fluid indicator positioned at the second location and contacting the wicking material,
    wherein the wicking material draws fluid leaked from the first location to the second location, where the fluid contacts the remote fluid indicator.

2. The apparatus of claim 1, wherein the cartridge defines a drain aperture.

3. The apparatus of claim 1, wherein the wicking material comprises a nylon mesh material that is attached to the channel laminate.

4. The apparatus of claim 1, wherein the remote fluid indicator comprises a color-changing tape indicator.

5. The apparatus of claim 1, wherein the wicking material comprises a first end and a second end, the first end of the wicking material extends from the channel laminate to the remote fluid indicator on a first side of the fluidic device.

6. The apparatus of claim 5, wherein the second end of the wicking material does not extend beyond a second side of the fluidic device.

7. The apparatus of claim 1, further comprising an optical sensor to detect a detectable alteration produced when the fluid contacts the remote fluid indicator, wherein the optical sensor does not physically contact the remote fluid indicator.

8. The apparatus of claim 7, wherein the optical sensor comprises a light source, a color sensor, and a printed circuit board, the light source and the color sensor connected to the printed circuit board.

9. The apparatus of claim 1, wherein the first location is vertically spaced from the second location.

10. The apparatus of claim 9, wherein the wicking material comprises an incline portion that is positioned between the first location and the second location.

11. The apparatus of claim 1, wherein:
  the wicking material is configured to draw leaked fluid escaping a fluid retention boundary;
  the first location is disposed proximate to the fluid retention boundary so as the wicking material is to be exposed to the leaked fluid escaping the fluid retention boundary;
  the wicking material has one of: (1) multiple segments including a cross segment and a longitudinal segment; or (2) a single segment; and
  a detectable alteration to the remote fluid indicator is produced when fluid contacts the remote fluid indicator.

12. The apparatus of claim 11, wherein the detectable alteration comprises a color change.

13. The apparatus of claim 11, wherein the remote fluid indicator comprises a tape indicator.

14. The apparatus of claim 11, further comprising an optical sensor to detect the detectable alteration, wherein the optical sensor does not physically contact the remote fluid indicator.

15. The apparatus of claim 11, wherein the wicking material comprises one of a woven material or a nylon mesh fiber material.

16. The apparatus of claim 11, wherein the wicking material at the first location is proximate to a fluid-sensitive element.

17. The apparatus of claim 11, further comprising an optical sensor and a communication component coupled to the optical sensor, the communication component to produce a signal when the optical sensor detects the detectable alteration.

18. The apparatus of claim 11, wherein the wicking material is attached to a surface at the first location by a hydrophilic adhesive.

19. The apparatus of claim 18, wherein the wicking material and the hydrophilic adhesive have a maximum combined thickness of about 120 μm at the first location.

20. The apparatus of claim 1, wherein the channel laminate comprises a first channel laminate incline portion and a second channel laminate incline portion that extend from the fluid interface, wherein the fluid leaked from the first location can flow down the first channel laminate incline portion and down the second channel laminate incline portion.

21. The apparatus of claim 20, further comprising an absorbent pad carried by the cartridge and positioned to absorb the leaked fluid that flows down the first channel laminate incline portion and down the second channel laminate incline portion.

22. The apparatus of claim 21, wherein the wicking material comprises a cross segment and a longitudinal segment, the cross segment extending across a portion of the channel laminate proximate the fluid interface, the longitudinal segment overlying the first channel laminate incline portion and the second channel laminate incline portion.

23. The apparatus of claim 1, further comprising a carrier plate on which the fluidic device is positioned.

24. The apparatus of claim 23, further comprising a second wicking material disposed on the carrier plate, surrounding the fluidic device, and contacting the remote fluid indicator.

25. The apparatus of claim 24, wherein the wicking material comprises a first end and a second end, the first end of the wicking material extends from the channel laminate to the remote fluid indicator on a first side of the fluidic device and the second end of the wicking material extends from the channel laminate and contacts the second wicking material on a second side of the fluidic device.

26. The apparatus of claim 24, wherein the second wicking material comprises a mixture of polyester and cellulose and is attached to the carrier plate.

\* \* \* \* \*